March 3, 1931. W. L. GRAY 1,794,846
PNEUMATIC RIVET PASSER
Filed April 8, 1927 2 Sheets-Sheet 1

INVENTOR
William L. Gray.
BY
R. S. C. Dougherty
ATTORNEY

March 3, 1931. W. L. GRAY 1,794,846
PNEUMATIC RIVET PASSER
Filed April 8, 1927 2 Sheets-Sheet 2
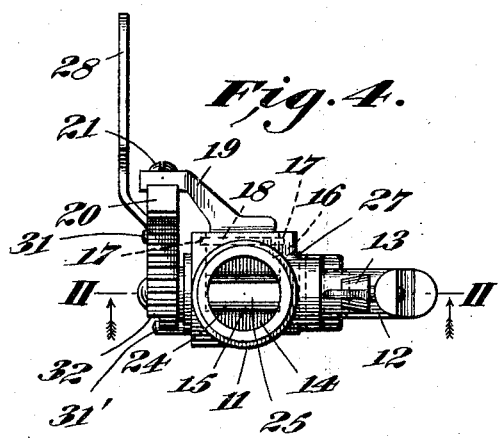
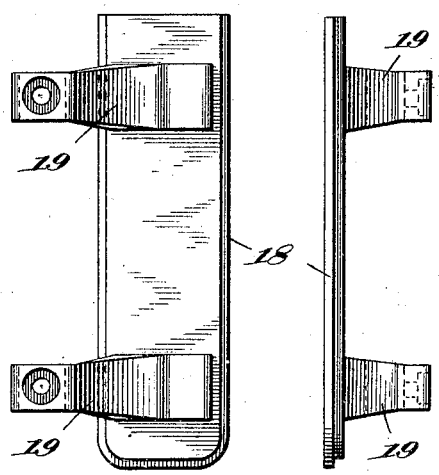
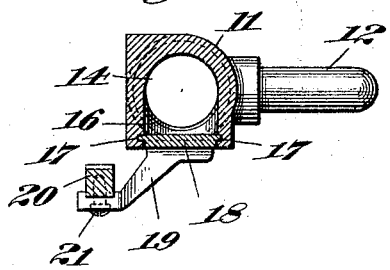
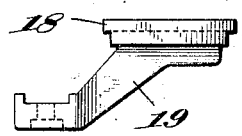
INVENTOR
William L. Gray.
BY R. S. C. Dougherty
ATTORNEY Patented Mar. 3, 1931

1,794,846

UNITED STATES PATENT OFFICE

WILLIAM L. GRAY, OF NORTH WEYMOUTH, MASSACHUSETTS, ASSIGNOR TO BETHLEHEM SHIPBUILDING CORPORATION

PNEUMATIC RIVET PASSER

Application filed April 8, 1927. Serial No. 181,999.

My invention relates to new and useful improvements in pneumatic rivet passers.

The primary object of this invention is to provide a novel form of pneumatic rivet passer which is rugged in structure, cheap and easily manufactured and which contains a minimum number of parts. In a broader aspect my invention pertains to a rivet passer of the cylindrical type, which is adapted to be inserted directly in the air line and attached to the forge where rivets are heated.

The novel features of my invention will be more fully understood from the following description and claims taken with the accompanying drawings in which:

Fig. 4 is a bottom plan view of the apparatus;

Fig. 5 is a cross-sectional view taken on line V—V of Fig. 3;

Figs. 6 and 7 are elevations of the door of the rivet passer;

Fig. 8 is an end elevation of the door of the rivet passer.

Figure 1:
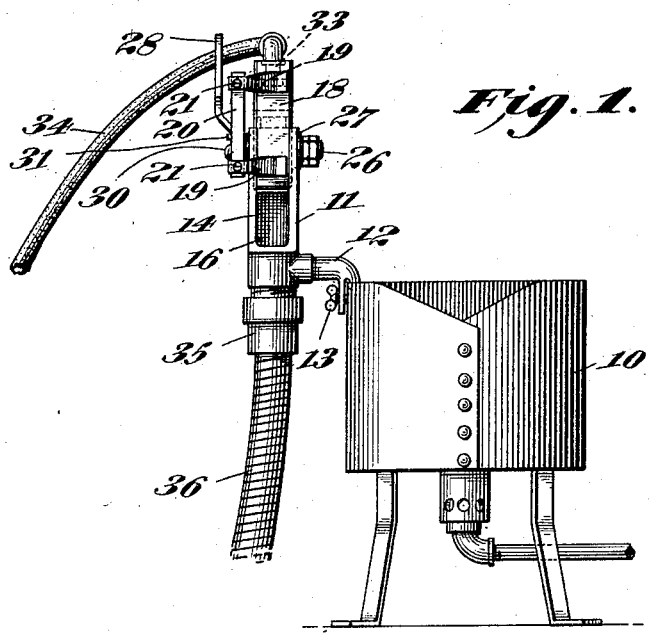
Fig. 1 is a side elevation of the apparatus embodying my invention.
Figure 2:
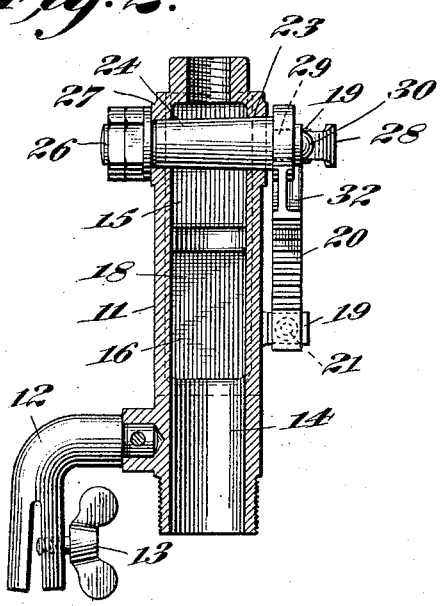
Fig. 2 is a cross sectional view taken on line II—II of Fig. 4.
Figure 3:
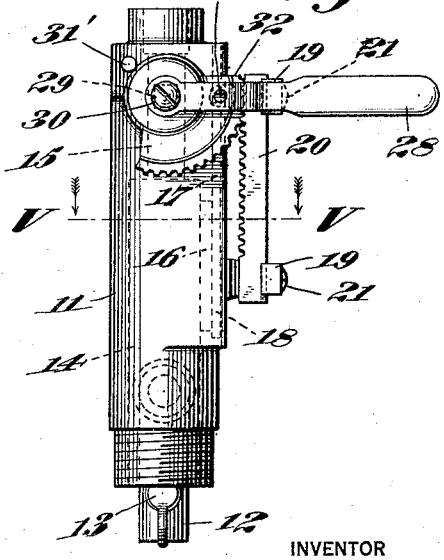
Fig. 3 is a side elevation of the rivet passer.

Referring to the drawing: 10 designates a forge of any suitable construction for heating rivets. The body 11 of the rivet passer is provided with a bracket 12 bifurcated at its end to straddle the wall of the pan of the forge and is clamped thereto by means of the screw 13 threaded to the bracket. The body 11 is provided with a cylindrical chamber 14 at its lower end and a passageway 15, which is preferably rectangular in cross section and open to chamber 14. The body 11 is provided with a laterally disposed elongated opening 16 of such proportion that a rivet blank may freely pass therethrough into the chamber 14. Grooves 17 are provided in the body 11 to constitute a slideway in which the door 18 is slidably mounted. Fastened to the outer face of the door are brackets 19 which support the toothed rack 20, the rack being fastened thereto by the screws 21.

A tapered valve seat 23 is bored diametrically through the body 11 at a position approximately midway between the upper end of the body 11 and the chamber 14, and is adapted to receive a rotatable valve plug 24 the axis of which is in the plane of the major axis of the passageway 15. The valve plug 24 is of a diameter materially larger than the width of the passageway 15 and is provided with a rectangular lateral opening 25 which is of substantially the same cross section as the passageway 15. The end 26 of the valve plug 24 is threaded and extends beyond the face of the boss 27 formed on the body 11. A pair of nuts and a washer are mounted on the threaded end 26 for the purpose of drawing the valve plug 24 tightly to its seat 23.

A sector gear 32, having a square aperture therein, is mounted on the end 29 of valve plug 24. In order to rotate the valve plug 24 and the gear 32 I provide an operating handle 28.

Suitable means are provided to retain the handle 28 in fixed relation to the valve plug 24 and the gear 32, and for this purpose I show machine screws 30 and 31 threaded in the end of the valve plug 24 and the side of the gear 32, respectively. By rotating the valve plug 24, through the medium of the handle 28, the opening 25 may be placed in registry with the passageway 15 so that compressed air may pass freely through the passageway 15 to the chamber 14, as hereinafter described. In the preferred embodiment of my invention, when said opening and said passageway are in alignment, the handle is set in a horizontal position and when the latter is turned to a vertical position the opening is disposed at right angles to the vertical axis of the passageway 15 whereby the imperforate surface of the valve plug prevents the passage of the air to the chamber 14. A stop 31' is provided on the body 11 to prevent the handle from being turned beyond its vertical position.

The sector gear 32 meshes with the rack 20 so that the door 18 is caused to slide in the grooves 17 upon rotation of the handle 28. The handle 28 is arranged so that when the opening 25 in the valve plug 24 is at right angles to the passageway 15 the door 18 is in its opened position and a rivet blank may be freely passed into the chamber 14.

The upper end of the body 11 is bored centrally and threaded to receive the nipple 33 of a hose 34 in order to connect the upper end of the passageway 15 with a source of compressed air supply. The lower end of the body 11 is threaded to receive a coupling 35 of a conduit 36 for the purpose of conveying the rivet to a distant point, in a manner well known to the art.

In operation, assuming the handle 28 to be in a vertical position, compressed air is contained within hose 34 and the door 18 is in its opened position, a heated rivet is placed in the the chamber 14. By turning the handle through approximately 90° the opening 25 in the valve plug 24 is aligned with the passageway 15 thus allowing the compressed air to pass to the chamber 14; simultaneously, due to the meshing gears 32 and 20, the door 18 is lowered to its closed position which prevents the egress of the compressed air through the opening 16, thus the full force of the air is effective to propel the rivet through the conduit 36 to the point of use. Upon turning the handle to its original position the air is shut off and the door 18 is returned to its opened position, thus the chamber 14 is opened for the reception of the next rivet to be passed.

From the foregoing it will be clearly seen that I have devised a rivet passer which is simple in construction, not liable to get out of order and the parts of which are easily accessible for adjustment or replacement. And, furthermore, with a device of the character described a single movement by the operator effects the operation thereof.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

Having thus described my invention what I claim as new and desire to secure by Letters Patent is:

1. A rivet passer, comprising a hollow body having a slideway formed thereon, a door slidably mounted within said slideway, a rack mounted on said door, a rotatable valve in said body, a member mounted on said valve operatively engaging said rack and means to rotate the valve.

2. A rivet passer comprising a hollow body having a slideway and having an aperture therein for receiving rivets, a slidable door mounted in said slideway, a rack mounted on said door, a rotatable valve having a gear mounted thereon in meshed relation with said rack, and a handle adapted to rotate the valve gear.

3. A rivet passer, comprising a hollow body having an aperture therein for the passage of rivets to the interior of the body, a conduit adapted to connect the interior of said body to a source of fluid supply, a slideway mounted longitudinally of said body, a closure slidably mounted within said slideway and adapted to close said aperture, a member mounted on said closure, a rotatable valve mounted in said conduit, a member mounted on said valve and operatively connected to the first mentioned member, and a handle adapted to rotate said valve.

4. A rivet passer comprising a hollow body having an aperture therein for receiving rivets, a slideway mounted longitudinally of said body adjacent said aperture, a closure slidably mounted within said slideway, a conduit for admitting compressed air to said body, a valve within said conduit, and a handle for said valve and means operatively connecting said handle to said closure adapted to operate the closure upon the movement of the handle.

In testimony whereof I hereunto affixed my signature.

WILLIAM L. GRAY.